Jan. 31, 1961   G. ZIBRITOSKY ET AL   2,969,710
ELEVATED TEMPERATURE EXTENSOMETER
Filed March 27, 1958

WITNESSES
John L. Heasley Jr.
James F. Young

INVENTOR
George Zibritosky &
Arthur Bush
BY
George C. Thompson
ATTORNEY

United States Patent Office 2,969,710
Patented Jan. 31, 1961

2,969,710

ELEVATED TEMPERATURE EXTENSOMETER

George Zibritosky, Wilkinsburg, and Arthur J. Bush, Forest Hills, Pa., assignors to Westinghouse Electric Corporation, East Pittsburgh, Pa., a corporation of Pennsylvania Filed Mar. 27, 1958, Ser. No. 724,408

12 Claims. (Cl. 88—14)

This invention relates to a high temperature extensometer or optical strain gage, and more particularly, to a reflecting means used to provide accurate readings in an extensometer at high temperatures.

In some previous extensometers polished metal surfaces have been provided of metal alloys capable of withstanding high temperatures while maintaining a clear light reflection from an autocollimator. Devices of this nature have been found satisfactory in temperatures up to 500° F. utilizing suitable iron alloy metals capable of maintaining a good mirror surface for a reasonable length of time. In order to maintain the necessary hardness for accurate measurements at higher temperatures than 500° F., metal alloys using Ni and Cr are generally believed to be needed. However, when alloys of this nature are used, it is found that a good reflecting surface cannot be maintained for suitable periods of time at the higher temperatures due to severe oxidation.

It is, therefore, an object of this invention to provide an optical strain gage capable of maintaining good reflective qualities while operating in the 1000 to 1500 degrees Fahrenheit temperature range.

It is another object of this invention to provide an optical strain gage having mirrors capable of maintaining their reflective quality while at the same time maintaining their hardness in the 1000° to 1500° temperature range.

It is another object of this invention to produce an optical strain gage having reflective portions or mirrors capable of easy replacement.

It is another object of this invention to provide an optical strain gage having reflective surfaces that are inexpensive to manufacture and replace when the need arises.

Other objects, purposes, and characteristic features of this invention will become more obvious as the description of the invention progresses.

In each of the several views, similar parts bear like reference characters.

Figure 1:
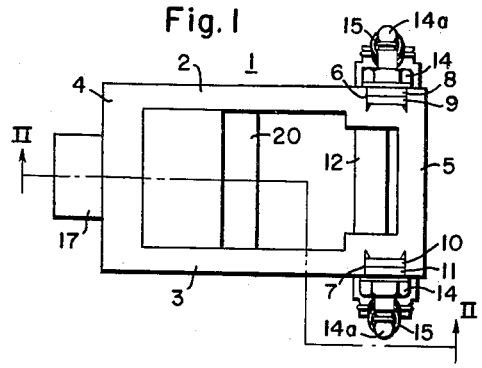
Figure 1 is a top plan view of one embodiment of this invention.
Figure 3:
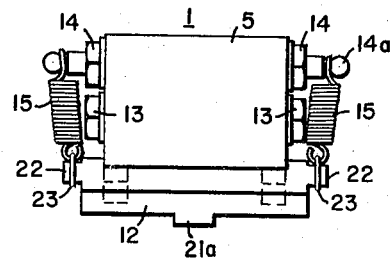
Fig. 3 is an end view of the embodiment shown in Figs. 1 and 2.
Figure 2:
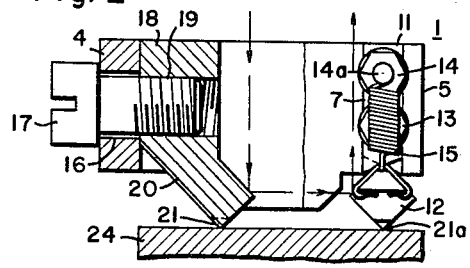
Fig. 2 is a partially sectioned elevation view taken along the lines II—II of Fig. 1.

The embodiment shown in Figs. 1 through 3 comprises a body 1 formed of two side plates 2 and 3 integrally connected together by a pair of end plates 4 and 5. This structure forms a box-shaped structure having open bottom and top portions. The side plates 2 and 3 are provided with vertically extending grooves 6 and 7 each containing a pair of pivot plates 8 and 9, and 10 and 11, respectively. The pivot plates 8 through 11 are provided with slanted downwardly extending end portions with the slanted ends of 8 and 9 being in opposing directions and the slanted ends of 10 and 11 also being in opposing directions. This arrangement forms a V-shaped downwardly projected pivot surface for receiving a reflective member or hinged mirror 12 to be explained hereinafter. The hinge plates 8 through 11 are secured in place by suitable bolts 13 and 14 with the bolts 14 being provided with extensions having a recess or knob 14a for securing suitable springs 15 for the hinge mirror 12 as will be explained hereinafter.

The end wall 4 is provided with an opening 16 for the purpose of receiving a securing screw 17 for a fixed reflective member or mirror support 18. The fixed mirror support 18 is provided with a threaded opening 19 and is of a width capable of spanning the width of the opening between the side plates 2 and 3. The fixed mirror support 18 is provided with a downwardly extending mirror portion 20 placed at an angle approximately 45° to the support portion of the fixed mirror 20 and is provided with a chamfered edge having a central unchamfered knife edge 21 for engaging a specimen of material to be tested. The upper surface of this approximately 45° mirror portion 20 is provided with a reflecting surface as described hereinafter.

The hinged mirror 12 is basically square in cross section with one of its edges projecting downwardly and chamfered except for a central portion providing a knife edge 21a for engaging the specimen to be tested. The mirror 12 is provided with extensions 22 on each end capable of providing anchoring horns for a pair of securing hooks 23 which are engaged by the springs 15 which are in turn fixedly anchored to the bolts 14. In this manner the hinged mirror 12 is pulled up against the slanted surfaces of the hinge plates 8 through 11 with the slanted surfaces causing the hinged mirror to take a position forming a mirrored surface approximately 45° to the horizontal. It is pointed out that the slanted surfaces forming the V-shaped hinged surface forms a recess having an angle greater than 90°, thus allowing the hinged mirror 12 limited pivotal movement about its upper corner engaging the slanted surfaces.

The fixed mirror support 18, its projection 20 and the hinged mirror 12 in this embodiment are formed of a metal having 83.875% Fe, 16% Al, 0.025% B, and 1% Zr. This combination is necessary to provide a metal sufficiently hard to maintain a knife edge capable of engaging the specimen as well as maintaining good reflective qualities during high temperature operation. The mirrored surface of these two mirrors is provided with a platinum film satisfactorily found to be approximately 100 angstroms thick, placed on the alloy mentioned above in any suitable manner such as by vapor deposit. This platinum film when polished maintains a good reflective surface at a temperature above 1000° for satisfactory periods of time.

Figure 7:
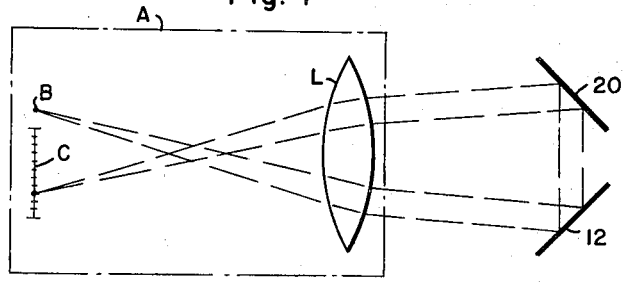
Fig. 7 is a diagrammatic view of an autocollimator in use with the present invention.

Operation of the device will now be explained. The optical strain gage is placed on a test specimen such as a specimen 24 with the knife edges 21 and 21a of the fixed and movable mirrors 20 and 12, respectively, engaging the test specimen 24. The specimen engaged is placed in an elevated temperature zone and raised up to the desired temperature. Observations of the specimen using an autocollimator A (see Fig. 7) providing a light source B and reading scales C is made during tension or compression test for detecting any elongation of the specimen due to this tension or compression. It is, of course, obvious that the body 1 is made of any suitable material having a low thermal expansion, such as a suitable ceramic material, a suitable alloy, as Stellite, or any other siutable material. When elongation occurs, it can be seen that the distance between the edges 21 and 21a becomes greater. As this distance lengthens, the mirror 12 pivots about its upper edge engaging the slant plates 8 through 11 causing the reflecting surface of the mirror to assume a different angle. This angle redirects the light from the lens L of autocollimator back to the lens L of autocollimator at a new angle indicating the amount of elongation experienced in the specimen 24. When compression occurs the mirror tilts in an opposite sense and now the autocollimator indicates the compression.

Figure 4:
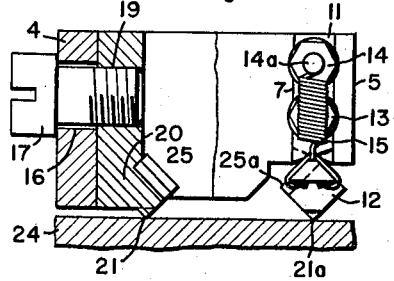
Fig. 4 is a partially sectioned elevational view of another embodiment of this invention.
Figure 5:
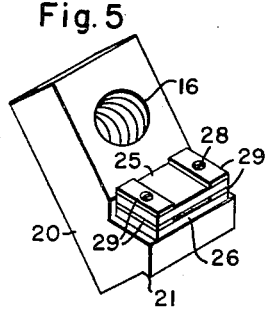
Fig. 5 is a view of the structure of one of the reflecting surfaces of Fig. 4.
Figure 6:
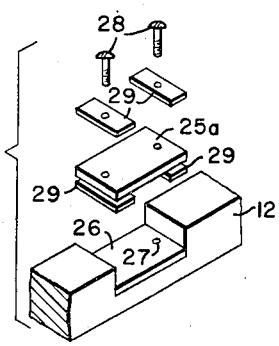
Fig. 6 is a view of the other of the reflecting surfaces of the embodiment of Fig. 4.

In order to provide an optical strain gage that can stand even higher temperatures than the one described in the previous embodiment, the embodiment shown in Figs. 4 through 6 is used. In this embodiment the fixed and movable mirors 20 and 12, respectively, are constructed of a cobalt-nickel-chromium-steel alloy capable of maintaining its hardness under extremely high temperatures, such as 1500° F. This material, however, is rapid to oxidize on any mirrored surface applied directly thereto. For this reason, the mirrored surfaces for the reflecting mirror elements 20 and 12 are provided by a piece of polished quartz material. The quartz may then have a platinum coating applied for a brighter mirror surface or used without the platinum coating.

The quartz mirror 25 is secured to the fixed mirror portion 20 and the quartz mirror 25a is secured to the hinged mirror 12 in the manner described hereinafter. Since metals such as the cobalt-nickel-chromium category are not practically drilled and tapped for minute size screws, a piece of material such as stainless steel 26 is drilled and tapped as at 27 to receive suitable anchoring screws 28 for holding the quartz mirrors 25 and 25a in place on the fixed and movable reflecting pieces 20 and 12, respectively. The anchoring plate may be of any suitable material such as stainless steel and is secured to the hard cobalt-nickel-chromium-steel by any suitable means such as brazing. In order to protect the quartz from scratches capable of causing cracks in the mirrored surface of the quartz, suitable shims 29 are provided. The shims 29 protect the quartz from being scratched in the application of the stainless steel screws used to anchor the quartz mirrors in position. It is noted that although stainless steel is indicated as the material used in the base piece, shims and screws, other materials may be more satisfactory if the material has a closer coefficient of expansion to the quartz used as a reflective surface. Since it is necessary to prevent quartz from bowing due to temperature changes, it is necessary to tighten only one of the anchoring screws for holding the quartz firmly anchored to the strain gage. The second screw merely acts as a guide for maintaining the quartz in proper position. Tightening of the second screw could cause a bowed condition in the quartz, and thus a distorted reading in the autocollimator. This species has the added advantage of providing readily replaceable mirrors without having to provide a remachined support of extremely hard material which is expensive to manufacture.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim this our invention:

1. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a first reflecting quartz mirror removably secured to said flat surface, a second base member of like material mounted near the other end member for pivotal movement about an axis parallel to said knife edge, said second base member having a flat surface thereon facing the flat surface on the first base member at a selected angle when the second base member is not pivotally moved from a normal position, and a second reflecting quartz mirror removably secured to said flat surface on the second base member, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

2. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as chromium, nickel and cobalt, exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a first reflecting quartz mirror removably secured to said flat surface, a second base member of like material mounted near the other end member for pivotal movement about an axis parallel to said knife edge, said second base member having a flat surface thereon facing the flat surface on the first base member at a selected angle when the second base member is not pivotally moved from a normal position, and a second reflecting quartz mirror removably secured to said flat surface on the second base member, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

3. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a first reflecting quartz mirror removably secured to said flat surface, a second base member of like material mounted near the other end member for pivotal movement about an axis parallel to said knife edge, said second base member having a flat surface thereon facing the flat surface on the first base member at a selected angle when the second base member is not pivotally moved from a normal position, and a second reflecting quartz mirror removably secured to said flat surface on the second base member, said quartz mirrors being coated with a reflecting film of platinum, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

4. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as chromium, nickel and cobalt exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a first reflecting quartz mirror removably secured to said flat surface, a second base member of like material mounted near the other end member for pivotal movement about an axis parallel to said knife edge, said second base member having a flat surface thereon facing the flat surface on the first base member at a selected angle when the second base member is not pivotally moved from a normal position, and a second reflecting quartz mirror removably secured to said flat surface on the second base member, said quartz mirrors being coated with a reflecting film of platinum, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

5. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals with the hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

6. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as chromium, nickel and cobalt exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material having a thermal expansion substantially equal to that of quartz rigidly secured to the flat surface, a flat reflecting quartz mirror rigidly secured at one end to the workable material by a suitable screw, and loosely held in guided position at its other end on the workable material by a suitable screw, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material having a thermal expansion substantially equal to that of quartz, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

7. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, relatively small thin shims on each side at each end of the mirror so that the mirror is protected against damage from manipulation of the screws, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, relatively small thin shims on each side at each end of the second mirror so that this mirror is protected against damage from manipulation of the screws, said quartz mirrors being coated with a reflecting film of platinum, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

8. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as aluminum and zirconium exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

9. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as chromium, nickel and cobalt exhibiting the characteristic of high strength at elevated temperatures, said base member being rigidly secured to one of the end members, and having a flat surface facing the other end member at a selected angle and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, said quartz mirrors being coated with a reflecting film of platinum, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

10. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals as aluminum and zirconium exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, said quartz mirrors being coated with a reflecting film of platinum, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

11. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, relatively small thin shims on each side at each end of the mirror so that the mirror is protected against damage from manipulation of the screws, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, relatively small thin shims on each side at each end of the second mirror so that this mirror is protected against damage from manipulation of the screws, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

12. A high temperature optical strain gage, in combination, a supporting body of a material having low thermal expansion and being substantially unaffected in its characteristics when subjected to relatively high temperatures, as 1000° F. to 1500° F., comprising a frame structure having a pair of facing substantially parallel end members, a first base member of an alloy of iron and other hardening and toughening metals exhibiting the characteristic of high strength at elevated temperatures, said base member being rigidly secured to one of the end members, and having a flat surface facing the other end member at a selected angle, and also having a knife edge below the end members and disposed parallel to the end members and flat surface, a flat piece of workable material, as some suitable metal, alloy, or other material, rigidly secured to the flat surface, a flat reflecting quartz mirror rigidly secured at one end to the workable material by a suitable screw, and loosely held in guided position at its other end on the workable material by a suitable screw, relatively small thin shims on each side at each end of the mirror so that the mirror is protected against damage from manipulation of the screws, said screws and shims preferably being made of the same material as said workable material, a second base member of like material mounted near the other end member for pivotal movement about an axis parallel to said knife edge, said second base member having a flat surface thereon facing the flat surface on the first base member at a selected angle when the second base member is not pivotally moved from a normal position, a second flat piece of workable material, as some suitable metal, alloy, or other material, rigidly secured to the flat surface of the second base member, a second flat reflecting quartz mirror rigidly secured at one end to the second flat piece of workable material by a suitable screw, and loosely held in guided position at its other end on the second plate of workable material by a suitable screw, relatively small thin shims on each side at each end of the second mirror so that this mirror is protected against damage from manipulation of the screws, said screws and shims preferably being made of the same material as said second plate of workable material, said second base member having a knife edge below the end members and disposed parallel to the pivotal axis of the second base member, whereby any light reflected by the first quartz mirror onto the second quartz mirror changes direction in proportion to the changes in distance between the knife edges on the two base members.

References Cited in the file of this patent

UNITED STATES PATENTS

| | | |
|---|---|---|
| 1,736,682 | Tuckerman | Nov. 19, 1929 |
| 2,085,687 | Peters | June 29, 1937 |
| 2,734,276 | Weaver | Feb. 14, 1956 |

FOREIGN PATENTS

| | | |
|---|---|---|
| 221,973 | Switzerland | Sept. 1, 1942 |